March 5, 1963  P. RUETSCHI ET AL  3,080,440
STORAGE BATTERY

Filed Dec. 31, 1959  2 Sheets-Sheet 1

INVENTOR.
PAUL RUETSCHI
BORIS D. CAHAN

ATTORNEY

INVENTOR.
PAUL RUETSCHI
BORIS D. CAHAN 3,080,440
STORAGE BATTERY
Paul Ruetschi, Glenside, and Boris D. Cahan, Philadelphia, Pa., assignors to The Electric Storage Battery Company, a corporation of New Jersey
Filed Dec. 31, 1959, Ser. No. 863,171
15 Claims. (Cl. 136—3)

The present invention generally relates to storage batteries. More specifically, the present invention is concerned with a storage battery which can be hermetically sealed to prevent the entrance therein or the escape therefrom of gases and vapors.

It is the general object of the present invention to provide a new and improved means for facilitating the removal of gases evolved during the operation of a storage battery in order that a battery may be operated in a sealed condition.

It is known that hydrogen is evolved from certain negative electrodes during open circuit stand, charging, discharging, and overcharge conditions. Hydrogen may also be evolved from positive electrodes during conditions of overdischarge or complete reversal of a cell. It is also known that oxygen is evolved from certain positive electrodes on open circuit stand, charging, discharging, and during overcharging from certain positive electrodes. Oxygen may also be evolved from negative electrodes during overdischarge or cell reversal. In order to operate a battery in a sealed condition, the evolved gases must be removed or recombined within the battery to avoid a build-up of pressure within the battery container and a resulting rupture of the battery container.

It is another object of the present invention to provide a means to oxidize electrochemically evolved hydrogen to water and to reduce electrochemically the evolved oxygen to water during open circuit stand, charge, discharge and overcharge and thus permit the operation of storage batteries under hermetically sealed conditions so long as overdischarge or complete reversal of the battery is not permitted to occur.

In the application of Paul Ruetschi for a patent on storage battery construction, Serial No. 641,050 filed February 19, 1957, now Patent No. 2,951,106, there is described a means by which oxygen can be reduced to water on a specially activated, partially waterproofed graphite element electrically connected to the negative plates of a battery. The reduction of oxygen by the described means is fairly efficient in both acid and alkaline electrolytes. If the amounts of charged and uncharged active materials in the positive and negative electrodes are adjusted for preferential oxygen evolution during overcharge, the evolution of hydrogen at the negative electrode is suppressed, since the current flowing to the electrode is used to reduce oxygen rather than to produce hydrogen and the cell described can be operated in a sealed condition. Unfortunately, in some types of batteries, some hydrogen will, nevertheless, be evolved at the negative electrode and cause a build-up of pressure. The reason for this behavior is that some types of negative storage battery electrodes have a potential more negative than the hydrogen electrode and some hydrogen therefore must be evolved at all times, during open circuit stand, charge, discharge or overcharge. This is the case, for example, in the lead-acid battery.

In U.S. Patent No. 2,104,973 of Adoph Dassler, there is described a means for absorbing gases evolved during battery operation comprising subsidiary hydrogen and oxygen electrodes which are in contact with the evolved gases or gaseous mixture and which are partly immersed in the battery electrolyte. The subsidiary electrodes, which have coatings of platinum or platinum sponge, are connected respectively to the positive and negative electrodes by means of resistors. In operation, oxygen is absorbed and ionized by the subsidiary electrode which is connected to the negative electrode and hydrogen is absorbed and ionized by the subsidiary electrode which is connected to the positive electrode.

In accordance with the present invention there is provided a pair of auxiliary electrodes connected respectively, to the positive and negative electrodes of the battery by means adapted to maintain the subsidiary electrodes at potentials which have been found to provide optimum recombination efficiency. The auxiliary electrode for the oxidation of hydrogen is preferably a porous semi-waterproof graphite element activated with a metal of the platinum group. The auxiliary electrode used for the reduction of oxygen is preferably a semi-waterproof graphite element activated with silver. The voltage regulating means utilized to maintain these auxiliary electrodes at optimum potentials for gas recombination is preferably one or more semi-conductor diodes connected in such a manner as to utilize the forward voltage drop thereof as the voltage regulating means.

A better understanding of the present invention may be had from the following description when read with reference to the accompanying drawings of which:

Figure 1:
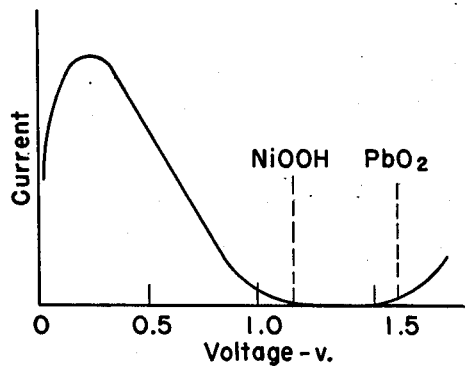
FIG. 1 is a graph illustrating the hydrogen oxidization capabilities of a platinum elecrode at various operating potentials.

In the operation of a storage battery in a sealed condition the oxidation of hydrogen to water on the positive electrode or on an auxiliary electrode connected thereto is extremely difficult. Experiments pertinent to this problem are described in an article, "Kinetics of Ionization of Molecular Hydrogen on a Platinum Electrode at Anodic Potentials" by Furmkin and Aikazyan, Doklady Akad. Nauk. SSSR 100, 315–318 (1955). In these experiments, a platinum electrode was immersed in sulfuric acid electrolyte and hydrogen gas was bubbled over the electrode. Various electrode potentials were applied to the electrode and the oxidation current of hydrogen was measured. The results of these experiments are shown in the curve of FIG. 1. Referring to this curve, it is seen that with increasing positive electrode potential, the current increases first very rapidly; however, at more positive potentials the current decreases and becomes very small. At extremely positive electrode potentials the current starts to rise again but now because of the beginning of oxygen evolution. The reason for the small currents in the region between $+0.8$ and $+1.8$ volts can be shown to be due to adsorption of OH— or $SO_4$— anions. The experiments show that an auxiliary, hydrogen-oxidizing element in a storage battery should preferably be kept at a potential somewhat, but not too much, more positive than the potential of a reversible hydrogen electrode.

Consider now the case of a hermetically sealed acid cell. The potential of the positive ($PbO_2$) electrode is $+1.7$ volts more positive than a hydrogen electrode. This potential is indicated on FIG. 1. It becomes apparent that almost no hydrogen can be oxidized to water at this potential. An element of platinum kept at this potential (e.g. by an electric contact with the positive electrode)

would not only be completely inefficient in oxidizing hydrogen, but it would induce evolution of oxygen at the platinum electrode, since the oxygen overvoltage of platinum is lower than that of $PbO_2$.

From the foregoing it can be seen that an auxiliary hydrogen-consuming element should be kept at a potential between 0.0 and +1.0 volts vs. a hydrogen electrode in the same solution. This conclusion applies to both acid and alkaline electrolytes. Since in a lead acid battery the positive electrode is at +1.70 volts, the auxiliary hydrogen elements should be kept at a potential between −1.70 and −0.70 volts with respect to the positive electrode.

In the case of hermetically sealed nickel-cadmium batteries, the positive electrode is at a potential of +1.2 volts vs. a hydrogen electrode in the same solution. Again, this potential is in the region where, according to FIG. 1, the oxidation current for hydrogen is small. An auxiliary element connected directly to the positive electrode would therefore be unable to oxidize appreciable amounts of hydrogen gas to water. It would be preferable to keep the element at a potential between −1.2 and −0.4 volts with respect to the nickel hydroxide positive.

There are several materials which have been found suitable for use in auxiliary electrodes for the oxidation of hydrogen. For example, it has been found applicable to employ a porous semi-waterproofed graphite element activated with a metal of the platinum group. The elements of the platinum group are platinum, palladium, iridium, rhodium, ruthenium and oxmium. Other metals can be used either as carriers or as activators. However, at the electrode potential at which they are used, such metals should not undergo oxidation or form oxide layers which would inhibit the hydrogen oxidation reaction. In sulfuric acid solution, copper could be used only in the potential region between 0.0 and +0.2 volt, silver between 0.0 and about +0.6 volt, mercury between 0.0 and +0.7 volt, gold and the metals of the platinum group between 0.0 and +1.0 volt vs. hydrogen in the same solution. Of these materials, the metals of the platinum group have the highest activity for the oxidation of hydrogen. In alkaline solutions the situation is slightly different, and it can be shown from the oxidation potentials of the various metals that the following ranges are applicable. Nickel can be used only in the potential region between 0.0 and +0.1 volt, lead between 0.0 and +0.2 volt, copper between 0.0 and +0.4 volt and silver, gold and the metals of the platinum group between 0.0 and 1.1 volts vs. a hydrogen electrode in the same solution. It is possible to use these metals as promoters on inert carriers such as semi-waterproofed graphite, or other conductive inert materials or porous bodies with conductive surfaces, or as both carriers and activators.

In the case of auxiliary elements for reduction of oxygen gas there are also optimum conditions for most efficient operation. It happens that in a number of batteries that the potential of the negative electrode is more negative than the potential of a hydrogen electrode in the same solution. This is the case in the lead-acid battery where the potential is at −0.35 volt vs. hydrogen. The attachment of an auxiliary element at this potential will in general increase the hydrogen evolution since few materials have as high a hydrogen overvoltage as metallic lead. In addition, it has been found the same effect as described above exists for the hydrogen element, namely, cations (in acid solution essentially protons) adsorb or even partially discharge at these negative potentials and inhibit the fast reduction of oxygen. It has been found that when an increasingly negative electrode potential is applied to a silver activated graphite element which is partially immersed in sulfuric acid and in contact with an oxygen atmosphere that as the potential becomes more negative than the hydrogen electrode potential the rate of reduction of oxygen starts to slow down.

There is another very important problem which should be mentioned in this connection. If the auxiliary elements for oxygen reduction are kept at a too negative potential, the wetting of the elements proceeds rapidly. If an activated element is kept at the potential of the oxygen electrode (at +1.0 to +1.2 volts vs. hydrogen in acid solution), the rate of wetting is quite slow. As the potential is made more negative, the rate of wetting starts to increase and if the element is polarized to potential values more negative than the hydrogen electrode the wetting proceeds rapidly. If the elements are wetted with electrolyte, the pores are filled up and most of the active area (solid-gas-liquid interface) is lost. For activated graphite elements attached to negative plates of lead acid batteries, wetting is increased by applied vacuum and increased negative electrode potential.

The wetting of the elements is particularly serious in alkaline electrolytes. Silver-activated graphite elements which are waterproofed with a hydrophobic thermoplastic resin are wetted completely within a few days when attached directly to the cadmium negatives of a nickel-cadmium battery. The adsorption and/or discharge of cations thus not only decreases the rate of reduction of oxygen at the elements by inhibition through blocking action, but also increases wetting of the elements which decreases the active surface area. The adsorption and the wetting processes go hand in hand.

The above discussion shows that it is advantageous to keep the auxiliary elements for the reduction of oxygen at a potential only slightly negative with respect to the potential of the oxygen electrode in the same solution. In lead acid batteries, the oxygen electrode potential is 1.55 volts more positive than the potential of the negative electrode. It is therefore proposed to keep the oxygen reducing element at some potential, positive with respect to the potential of the negative electrode by an amount not exceeding 1.5 volts, but not less than 0.4 volt to assure both fast reduction of oxygen and a low rate of wetting.

In addition, the catalytically active material to be used should not be subject to oxidation at the electrode potential at which the element is operated. The critical ranges are determined by the oxidation potentials of the materials, as illustrated previously for hydrogen oxidizing elements. Silver is an excellent promoter for the reduction of oxygen. In sulfuric acid solution it would be used in the potential range between +0.4 and +0.9 volt with respect to the negative electrode. At more positive potentials, silver is oxidized to silver sulfate.

In alkaline solution, silver is oxidized to silver oxide at potentials more positive than 1.1 volts vs. a hydrogen electrode in the same solution, or vs. a cadmium electrode (since the hydrogen and cadmium electrode potentials differ by only a few millivolts in alkaline solutions). An oxygen reducing element using silver could therefore be used in alkaline nickel-cadmium batteries at potentials between 0.0 and +1.1 volts vs. a cadmium electrode. Because wetting of porous elements increases with increasing negative potential, it would be preferable to operate the element between +0.5 and +1.1 volts vs. a cadmium electrode.

As mentioned hereinbefore, the auxiliary electrodes in accordance with the present invention are preferably a porous conducting body activated by the inclusion therein of a catalytic agent of a type which promotes the oxidation of hydrogen or the reduction of oxygen. By way of illustration and not by way of limitation, an electrode suitable for the oxidation of hydrogen may be prepared by heating a block of porous graphite to a temperature of above about 700° C. for a few minutes to remove any impurities within the graphite. After cooling, the block may be dipped in a solution of palladium chloride ($PdCl_2$). After the block has been thoroughly immersed with the solution, it is then heated to a temperature of about 600° C. at which temperature the salt decomposes leaving finely divided palladium metal dispersed on the surface of the graphite element.

The element is then cooled and immersed in a dilute solution of tetrafluoroethylene emulsion, dried and subsequently baked at 400° C. The emulsion of tetrafluoroethylene may be prepared by adding from 0.5 cc. to 10.0 cc. of a sixty percent tetrafluoroethylene emulsion to 100 cc. of distilled water. The emulsion treatment has been found to enhance the non-wetting character of the impregnated graphite element.

An auxiliary electrode specifically adapted to promote the reduction of oxygen may be prepared in the manner described above substituting a silver nitrate solution for the solution of palladium chloride. Upon the heating of such an impregnated element, the silver nitrate will decompose leaving silver dispersed throughout the graphite.

In accordance with the present invention it is proposed to maintain auxiliary electrodes of the type described hereinbefore at a given potential with respect to their associated battery electrodes irrespective to the current flowing therethrough. To this end, it is further proposed to utilize voltage regulating means to connect the auxiliary electrodes to their associated electrodes. The forward voltage drop of semi-conductor diodes has been found to be ideally suited for this purpose. The forward voltage drop of such circuit elements are generally within the range of from about 0.1 to about 1.0 volt irrespective of the current flow therethrough. Accordingly, one or more series connected semi-conductor diodes may be utilized to provide the desired optimum potential for an auxiliary electrode.

Figure 2:
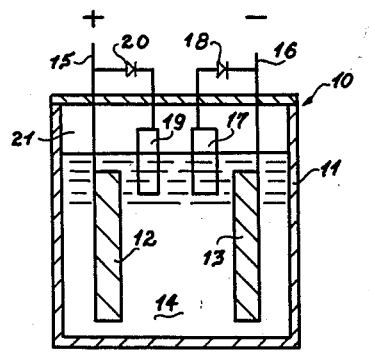
FIG. 2 is one embodiment of a battery in accordance with the present invention.

Referring now to FIG. 2, the numeral 10 indicates a battery in accordance with the present invention having a hermetically sealed container 11. The battery 10 includes a positive electrode 12 and a negative electrode 13 in a suitable electrolyte 14. An electrical lead 15 from the positive electrode 12 and an electrical lead 16 from the negative electrode 13, which pass through suitable seals in the casing 11, are provided for connection with an external circuit. An oxygen consuming element 17 is connected through one or a series of diodes 18 to the negative electrode 13 and the lead 16. Similarly, a hydrogen consuming element 19 is connected to the positive electrode 12 through one or a series of diodes 20 and the lead 15. As will be understood by those skilled in the art, the aforementioned connections may be made externally as shown or, if desired, the connections may be achieved with the cell container 11. It should be noted that both the oxygen consuming element 17 and the hydrogen consuming element 19 are partly immersed in the electrolyte 14 and extend into the gas space 21 above the electrolyte 14.

If the sealed battery 10 is of the lead-acid type, the hydrogen consuming auxiliary electrode 19 will be kept at a potential of between −1.70 and −0.70 volts with regard to the lead oxide positive electrode. In the same type of battery, the oxygen consuming auxiliary electrode 17 will be maintained at a potential of between +0.4 and +0.9 volt with respect to the negative lead electrode if the elements are of the type described hereinbefore. If the sealed battery 10 is of the nickel-cadmium type, the hydrogen consuming electrode 19 will be kept at a potential of between −1.2 volts and −0.2 volt with respect to the nickel positive electrode and the oxygen consuming electrode 17 will be kept at a potential of between +0.5 and +1.1 volts with respect to the negative cadmium electrode. In each case, the connecting diode or diodes will be selected so as to maintain these preferred ranges of auxiliary electrode potential.

As shown in FIG. 2 the auxiliary electrodes are positioned in the cell so as to be in contact with both the electrolyte and the gas phase above the electrolyte. When so positioned and their potentials are maintained in a manner described hereinbefore hydrogen gas evolved in the negative electrode is ionized to positive species on the auxiliary electrode 19. The electrons produced by this process flow through the diode 20 to the positive electrode and then either through the external circuit to the negative electrode or they discharge the positive electrode. As oxygen gas is evolved at the positive electrode and reaches the gas space over the electrolyte, it is ionized to negative species at the oxygen consuming electrode 17 by electrons which flow through the diode 18 from the negative electrode where they are supplied either by an external current or by a discharge of the negative plate.

Figure 3:
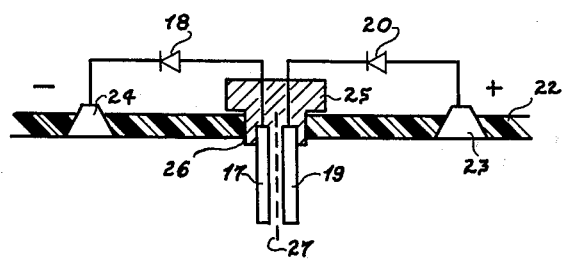
FIG. 3 is another embodiment of a battery in accordance with the present invention.

Referring now to FIG. 3, there is shown an alternate arrangement of the auxiliary electrodes in the form of a plug-in device. In the figure, the numeral 22 indicates a battery cover having a positive terminal 23 and the negative terminal 24 projecting therethrough. In this modification of the present invention, the gas consuming electrodes 17 and 19 are mounted in a vent plug 25 to be inserted in the vent well 26 in the battery cover 22. As shown, the auxiliary electrodes 17 and 19 are separated from each other by an insulating separator 27. The auxiliary electrode 17 is activated as an oxygen reducing electrode, as with silver, and is connected to the negative terminal of the battery 24 through the diode 18. The other auxiliary electrode 19 is activated as a hydrogen electrode, as for example, with palladium and connected through the diode 20 to the positive terminal 23 of the battery.

In considering the operation of a sealed battery in accordance with the present invention, it should be understood when two auxiliary electrodes are provided and maintained at optimum gas recombination potentials, it has been found that it is unnecessary to maintain any fixed ratio of charged or uncharged active material in either the positive or the negative electrodes in order to establish preferential gas evolution. It has been found, however, that sealed coil operation is possible utilizing a single auxiliary electrode, maintained at an optimum gas recombination potential, if the ratios of uncharged active material in the cell electrodes is proportioned in such a manner as to establish a preferential evolution of gas from the electrodes opposed to the electrodes to which the auxiliary electrode is connected. For example, it has been found possible to operate a sealed cell constructed to establish the preferential evolution of hydrogen with a hydrogen consuming auxiliary electrode connected to the positive electrode of the cell and maintained at the optimum potential for hydrogen consumption with respect to the positive electrode. The reason that this mode of operation with a single gas recombination electrode is possible is believed to reside in the fact that a properly biased auxiliary electrode activated with certain catalytic agents such as the metals of the platinum group is capable of removing both oxygen and hydrogen. Thus, it is believed that a hydrogen auxiliary electrode is operable to effect the electro-chemical reduction of oxygen by hydrogen on its activated surface. The oxygen is adsorbed and takes up electrons at the interface, which electrons are delivered by the ionization of hydrogen. The ionized oxygen and hydrogen species recombine to form water at the active surface. In this respect, it has been found possible to improve the oxygen recombination efficiency of a hydrogen auxiliary electrode, by further activating such an electrode with silver. By way of illustration, an electrode impregnated in palladium in the manner described hereinbefore, can be further impregnated with silver nitrate and the latter thermally decomposed to silver.

There are particular advantages to the operation of a sealed cell on the hydrogen cycle with a single gas recombination element attached to the positive plate. For example, this mode of operation will minimize sulfation of the negative electrode, auxiliary electrode wetting is less serious at positive operating potentials than at negative potentials and oxygen leaking in from the atmosphere through improper seals cannot discharge the negative electrode.

It has also been found that it is possible to operate a sealed cell with a single oxygen recombination electrode if the cell is operated on the oxygen cycle and the auxiliary electrode properly biased to maintain optimum gas recombination potentials. For this mode of operation, however, it has been found necessary to further impregnate the silver activated oxygen recombination electrode with palladium to enhance the hydrogen recombination properties of the electrode. Such an element is then kept positive to the hydrogen electrode potential by proper bias connections with the negative electrode and hydrogen will be electro-chemically oxidized by excess oxygen in the cell.

Figure 4:
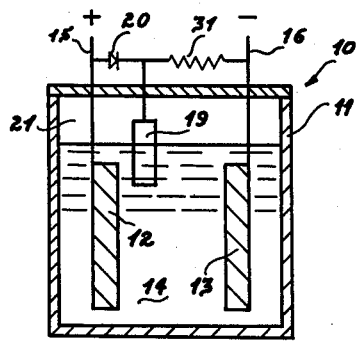
FIG. 4 is a further modification of a battery in accordance with the present invention.

Referring now to FIG. 4, there is shown a modification of the present invention in which a single gas consuming element is maintained at optimum gas recombination potentials with respect to the positive plate. Similar reference characteristics have been employed to designate components similar to those in FIG. 1. As shown, this embodiment of the present invention differs from the embodiments discussed hereinbefore in that a resistor 31 is connected between the auxiliary electrode 19 and the negative electrode 13. With respect to the use of this resistor, it has been found that where a diode is used to maintain a relatively constant voltage drop between gas consuming auxiliary electrode and the positive electrode and the gas is completely exhausted, that the current in the diode drops to zero or to an extremely low value which raises the potential of the auxiliary electrode 19 to that at which the catalytic material therein will start to dissolve. The resistor 31 connecting the auxiliary gas consuming electrode 19 to the negative electrode 14 is selected to draw a minimum current at all times which will maintain a voltage drop across the diode 20 and thus maintain the potential of the auxiliary electrode such that the catalytic material will not dissolve. By way of example, if the resistor 31 has a value of 500 ohms, and the hydrogen within the cell is exhausted, the resistor will draw approximately one milliampere and with the proper choice of diodes 20, the voltage drop across the diode will be 1.2 volts. This then represents the maximum voltage that the auxiliary gas consuming electrode 19 can attain. As soon as hydrogen is produced in the cell additional current will be drawn through the diode raising the voltage drop only slightly because of the non-linear characteristics of that component decreasing the potential of the electrode, relative to hydrogen.

Figure 5:
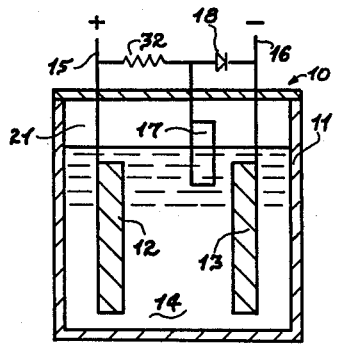
FIG. 5 illustrates a further modification of the present invention.
Figure 6:
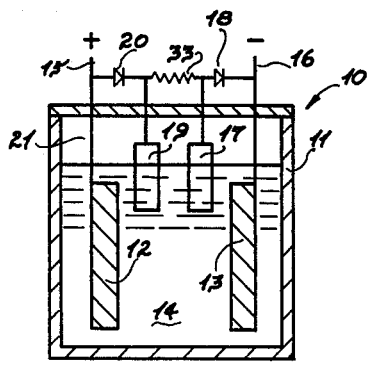
FIG. 6 illustrates a modification of the embodiments of the present invention shown in FIGS. 4 and 5.

It can be seen that the above teaching is applicable to the oxygen auxiliary electrode as well as the hydrogen combining electrode. In the case of the auxiliary electrode connected to the negative electrode, the problem is not one of the dissolving of the catalyst material but rather one of wetting and hydrogen evolution as the potential of the auxiliary electrode approaches that of the negative electrode as the oxygen in the cell is exhausted. Referring now to FIG. 5, there is shown a modification of the present invention which is adapted to maintain the optimum potential of an auxiliary oxygen consuming electrode. Again, similar reference characteristics have been utilized to indicate components similar to those in the other figures. In this figure, the numeral 32 designates a resistor having value selected to make a minimum current flow through the diode 18 in the manner described above. Resistors may be used to maintain a minimum current in both auxiliary electrodes in embodiments of the present invention utilizing two such electrodes. As shown in FIG. 6, a single resistor 33 connected between the auxiliary electrodes 19 and 17 may be utilized to maintain a minimum current in both auxiliary electrodes simultaneously.

Figure 7:
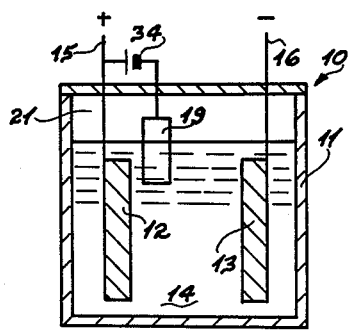
FIG. 7 illustrates still another modification of the present invention.

While in the discussion of the present invention given hereinbefore semi-conductor diodes have been mentioned as being particularly suited for maintaining the desired potentials in the auxiliary gas consuming elements it should be understood that other voltage regulating means may be utilized. Thus, it is within the scope of the present invention to utilize electronic regulating circuits as well as suitable battery means to achieve desired operating potentials for these electrodes. By way of illustration and not by way of limitation, a sealed nickel-cadmium battery 34 as shown in FIG. 7 has been found to have the proper potential to maintain the optimum gas recombination potential at an auxiliary hydrogen consuming electrode connected to the positive electrode of a lead-acid type storage battery.

Having described the present invention, that which is claimed as new is:

1. In a hermetically sealed storage battery containing an electrolyte, a gas chamber above the surface of said electrolyte and a positive electrode and a negative electrode in said electrolyte, an auxiliary electrode connected to one of said electrodes by means of voltage regulating means comprising the forward voltage drop of a semiconductor diode adapted to maintain the potential of said auxiliary electrode constant with respect to said electrode, said auxiliary electrode being partly immersed in said electrolyte and extending into said gas space, said auxiliary electrode comprising a porous conductive water-proofed matrix impregnated with a catalytic material active for gas recombination.

2. A battery as specified in claim 1 wherein said auxiliary electrode is connected to said positive electrode and is activated with a metal of the platinum group.

3. A battery as specified in claim 1 wherein said auxiliary electrode is connected to the negative electrode and is activated with metallic silver.

4. A battery as specified in claim 1 wherein the uncharged activated material of said positive and negative electrodes is proportioned so as to promote the evolution of gas on overcharge from the electrode opposed to the electrode to which the auxiliary electrode is connected.

5. In a hermetically sealed storage battery containing an electrolyte, a gas chamber above the surface of said electrolyte and a positive and a negative electrode in said electrolyte, a pair of auxiliary electrodes, one of said auxiliaries being connected to said positive electrode by voltage regulating means adapted to maintain the potential of said auxiliary electrode constant with respect to said positive electrode, the other of said auxiliary electrodes being connected to said negative electrode by second voltage regulating means adapted to maintain the potential of said auxiliary electrode constant with respect to said negative electrode, both the said auxiliary electrodes being partly immersed in said electrolyte and extending into said gas space, said auxiliary connected to said positive electrode comprising a porous conductive water-proofed matrix activated with a metal of the platinum group, said auxiliary electrode connected to said negative electrode comprising a porous conductive water-proofed matrix activated with metallic silver, said voltage regulating means comprising the forward voltage drop of semi-conductor diodes.

6. A hermetically sealed storage battery of the lead-acid type containing an electrolyte, a gas chamber above said electrolyte, and a positive electrode and a negative electrode in said electrolyte, an auxiliary gas consuming electrode connected to said positive electrode by voltage regulating means comprising the forward voltage drop of semi-conductor diode adapted to maintain the potential of said auxiliary electrode between −1.70 and −0.70 volts with respect to said positive electrode, said auxiliary electrode being partly immersed in said electrolyte and extending into said gas space, said auxiliary electrode comprising porous conductive water-proofed matrix impregnated with a metal of the platinum group, said positive electrode being characterized by having an excess of uncharged active material with respect to the active material of said negative electrode to promote the evolution of hydrogen from the negative electrode on overcharge.

7. A hermetically sealed storage battery of the lead-acid type containing an electrolyte, a gas chamber above said electrolyte, and a positive electrode and a negative electrode in said electrolyte, an auxiliary gas consuming electrode connected to said negative electrode by voltage regulating means comprising the forward voltage drop of a semi-conductor diode adapted to maintain the potential of said auxiliary electrode between +0.4 and +1.5 volts with respect to said negative electrode, said auxiliary electrode being partly immersed in said electrolyte and extending into said gas space, said auxiliary electrode comprising a porous conductive water-proofed matrix impregnated with silver and a metal of the platinum group, said negative electrode being characterized by having an excess of uncharged active material with respect to the active material of said positive electrode to promote the evolution of oxygen from the positive electrode or overcharge.

8. A hermetically sealed storage battery of the nickel-cadmium type containing an electrolyte, a gas chamber above said electrolyte, and a positive electrode and a negative electrode in said electrolyte, an auxiliary gas consuming electrode connected to said positive electrode by voltage regulating means comprising the forward voltage drop of a semi-conductor diode adapted to maintain the potential of said auxiliary electrode between −1.2 and −0.2 volts with respect to said positive electrode, said auxiliary electrode being partly immersed in said electrolyte and extending partly into said gas space, said auxiliary electrode comprising porous conductive water-proofed matrix impregnated with a metal of the platinum group, said positive electrode being characterized by having an excess of uncharged active material with respect to the active material of said negative electrode to promote the evolution of hydrogen from the negative electrode on overcharge.

9. A hermetically sealed storage battery of the nickel-cadmium type containing an electrolyte, a gas chamber above said electrolyte, and a positive electrode and a negative electrode in said electrolyte, an auxiliary gas consuming electrode connected to said negative electrode by voltage regulating means comprising the forward voltage drop of a semi-conductor diode adapted to maintain the potential of said auxiliary electrode between +0.5 and +1.1 volts with respect to said negative electrode, said auxiliary electrode being partly immersed in said electrolyte and extending partly into said gas space, said auxiliary electrode comprising a porous conductive water-proofed matrix impregnated with silver and a metal of the platinum group, said negative electrode being characterized by having an excess of uncharged active material with respect to the active material of said positive electrode to promote the evolution of oxygen from the positive electrode or overcharge.

10. A hermetically sealed storage battery comprising, in combination, an electrolyte, a gas chamber above the surface of said electrolyte, a positive electrode, a negative electrode, said positive and negative electrodes being in said electrolyte, a first auxiliary gas consuming electrode connected to said positive electrode by voltage regulating means comprising the forward voltage drop of a semi-conductor diode adapted to maintain the potential of said first auxiliary electrode constant with respect to said positive electrode, and a second auxiliary gas consuming electrode connected to said negative electrode by second voltage regulating means comprising the forward voltage drop of a semi-conductor diode adapted to maintain the potential of said second auxiliary electrode constant with respect to said negative electrode, each of said auxiliary electrodes being in said electrolyte and extending into said gas space, said first auxiliary electrode being activated with a catalytic material active for the consumption of hydrogen, said second auxiliary electrode being activated with a catalytic material active for the consumption of oxygen.

11. A combination as specified in claim 10 wherein said storage battery is of the lead-acid type and said first auxiliary electrode is maintained at a potential of between −1.70 and −0.70 volts with respect to said positive electrode and said second auxiliary electrode is maintained at a potential of between +0.4 volt and +1.5 volts with respect to said negative electrode.

12. A combination as specified in claim 11 wherein said storage battery is of the nickel-cadmium type and said first auxiliary electrode is maintained at a potential of between −1.2 and −0.2 volts with respect to said positive electrode and said second auxiliary electrode is maintained at a potential of between +0.5 and +1.1 volts with respect to said negative electrode.

13. A hermetically sealed storage battery containing an electrolyte, a gas chamber above the surface of said electrolyte, a positive electrode and a negative electrode in said electrolyte, an auxiliary hydrogen consuming electrode connected to said positive electrode by means of a semi-conductor diode selected to maintain the potential of said auxiliary electrode constant with respect to said positive electrode, part of said auxiliary electrode extending into said electrolyte and part extending into said gas space, and a resistor connected between said diode and said negative electrode, said resistor being selected to maintain a minimum current flow through said diode upon the exhaustion of hydrogen from said battery.

14. A hermetically sealed storage battery containing an electrolyte, a gas chamber above the surface of said electrolyte, a positive electrode and a negative electrode in said electrolyte, an auxiliary oxygen consuming electrode connected to said negative electrode by means of a semiconductor diode selected to maintain the potential of said auxiliary electrode constant with respect to said negative electrode, part of said auxiliary electrode extending into said electrolyte and part extending into said gas space, and a resistor connected between said diode and said positive electrode, said resistor being selected to maintain a main current flow through said diode upon the exhaustion of oxygen from said battery.

15. A hermetically sealed storage battery comprising in combination an electrolyte, a gas chamber above the surface of said electrolyte, a positive electrode, a negative electrode, said positive and negative electrodes being in said electrolyte, a first auxiliary gas consuming electrode connected to said positive electrode by semi-conductor diode means poled to maintain the potential of said first auxiliary electrode constant with respect to said positive electrode, a second auxiliary gas consuming electrode connected to said negative electrode by semi-conductor diode means adapted to maintain the potential of said auxiliary electrode constant with respect to said negative electrode, and a resistor connected between said first and second auxiliary electrodes, said resistor having a value such as to maintain a minimum current flow through said semi-conductor diode means, each of said auxiliary electrodes being partly in said electrolyte and partly in said gas space, said first auxiliary electrode being activated with a catalytic material active for the consumption of hydrogen, said second auxiliary electrode being activated with a catalytic material active for the consumption of oxygen.

References Cited in the file of this patent

UNITED STATES PATENTS

| | | |
|---|---|---|
| 2,104,973 | Dassler | Jan. 11, 1938 |
| 2,131,592 | Lange et al. | Sept. 27, 1938 |
| 2,275,281 | Berl | Mar. 3, 1942 |
| 2,624,033 | Jacquier | Dec. 30, 1952 |

FOREIGN PATENTS

| | | |
|---|---|---|
| 1,030,672 | France | Mar. 18, 1953 |